No. 785,003.

Patented March 14, 1905.

UNITED STATES PATENT OFFICE.

PAUL JULIUS, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION OF BADEN.

DICHLOR-DIMETHYL-FLUORANE AND PROCESS OF MAKING SAME.

SPECIFICATION forming part of Letters Patent No. 785,003, dated March 14, 1905.

Application filed June 14, 1904. Serial No. 212,570.

*To all whom it may concern:*

Be it known that I, PAUL JULIUS, a subject of the Emperor of Austria-Hungary, residing at Ludwigshafen-on-the-Rhine, in the Kingdom of Bavaria, German Empire, have invented new and useful Improvements in Dichlor-Dimethyl-Fluorane and Process of Making Same, of which the following is a specification.

My invention relates to the manufacture of dichlor-dimethyl-fluorane which can be used for the preparation of rhodamine coloring-matters, the method used being similar to that employed with dichlor-fluorescein, (dichlor-fluorane.) I have discovered that this compound can be prepared by heating together phthalic anhydrid and ortho-chlor-para-cresol in the presence of a condensing agent, for then the hydrogen atom which is in the ortho position to the hydroxyl group of the ortho-chlor-para-cresol reacts with the phthalic anhydrid and the pyrone ring is formed.

Since the ortho-chlor-para-cresol which I make use of in my invention is new, I give the following example, showing how it may be produced. The parts are by weight. Suspend one hundred and ninety and a half (190.5) parts of finely-divided ortho-chlor-para-toluidin sulfate in twelve hundred (1,200) parts of sulfuric acid, containing about twenty-five (25) per cent. of $H_2SO_4$, and add to this a concentrated solution of seventy (70) parts of sodium nitrite in water, whereupon a solution of the easily-soluble diazo compound is obtained. Now distil this solution with steam and collect the distillate which contains the chlor-cresol as an oil, separate this oil from the water, dry it, and then subject it to fractional distillation. This ortho-chlor-para-cresol is obtained in the form of colorless needles. It is somewhat soluble in water and very easily soluble in alcohol and ether.

The following example will serve to illustrate my invention and the method by which it can be carried into practical effect; but I do not limit my invention to this example. The parts are by weight. Mix well together equal parts of ortho-chlor-para-cresol, phthalic anhydrid, and zinc chlorid, and heat the mixture in an oil-bath at a temperature of from one hundred and eighty-five to one hundred and ninety degrees centigrade (185° to 190° centigrade) for a period of eight (8) hours. When cold, grind to powder the brown-black mass obtained and digest it for several hours on the water-bath with dilute caustic-soda solution. The dimethyl-dichlor-fluorane remains undissolved and can be filtered off. In order to obtain it quite pure, extract it with hot alcohol and crystallize the residue from ligroin or toluene. The pure compound forms small colorless crystals. It is easily soluble in chloroform and in hot nitrobenzene, but difficultly soluble in alcohol, ether, and benzene. It dissolves in concentrated sulfuric acid, giving a yellowish-green solution.

Now what I claim is—

1. The process for the production of dichlor-dimethyl-fluorane which consists in condensing phthalic anhydrid with ortho-chlor-para-cresol.

2. As a new article of manufacture the dichlor-dimethyl fluorane, such as can be produced by condensing phthalic anhydrid with ortho-chlor-para-cresol, which consists of colorless crystals, which is easily soluble in chloroform and in hot nitrobenzene, which is difficultly soluble in alcohol, ether and benzene, and which dissolves in concentrated sulfuric acid yielding a yellowish-green solution.

In testimony whereof I have hereunto set my hand in the presence of two subscribing witnesses.

PAUL JULIUS.

Witnesses:
JOSEPH H. LEUTE,
J. ALEC. LLOYD.